United States Patent [19]

Stapp

[11] Patent Number: 4,487,703
[45] Date of Patent: Dec. 11, 1984

[54] SURFACTANT AND PROCESS FOR ENHANCED OIL RECOVERY

[75] Inventor: Paul R. Stapp, Bartlesville, Okla.

[73] Assignee: Phillips Petroleum Company, Bartlesville, Okla.

[21] Appl. No.: 478,189

[22] Filed: Mar. 23, 1983

[51] Int. Cl.³ .......................... C09K 3/00; E21B 43/22
[52] U.S. Cl. ............................. 252/8.55 D; 166/275; 252/33
[58] Field of Search ............. 252/8.55 D, 33; 166/275; 549/261

[56] References Cited

U.S. PATENT DOCUMENTS

| | | | |
|---|---|---|---|
| 3,401,117 | 9/1968 | Schiff | 252/33 |
| 3,500,924 | 3/1970 | Poettmann | 166/274 |
| 4,124,512 | 11/1978 | Stournas et al. | 252/8.55 D |
| 4,217,958 | 8/1980 | Doster et al. | 166/274 |
| 4,252,192 | 2/1981 | Nussbaum et al. | 252/8.55 D |
| 4,266,610 | 5/1981 | Meister | 252/8.55 D |

FOREIGN PATENT DOCUMENTS 643575  6/1962  Canada ................ 252/8.55 D

*Primary Examiner*—Paul Lieberman
*Assistant Examiner*—Robert A. Wax

[57] ABSTRACT

A novel surfactant is formed by reacting maleic anhydride with either a petroleum sulfonate or an alkaryl sulfonate. A surfactant system containing the above surfactant useful in enhanced oil recovery processes is also provided.

10 Claims, No Drawings

SURFACTANT AND PROCESS FOR ENHANCED OIL RECOVERY

This invention relates to a novel surfactant composition as well as surfactant system containing the same. This invention also relates to a process for enhanced oil recovery employing the surfactant system.

Crude oil which has accumulated in subterranean formations is recovered or produced through one or more wells drilled into the formations. Initial production of the crude oil is accomplished by "primary recovery" techniques wherein only the natural forces present in the formation are utilized to produce the oil. However, upon depletion of these natural forces and the termination of primary recovery a large portion of crude oil remains trapped within the formation. Also, many formations lack sufficient natural forces to be produced by primary methods from the very beginning. Recognition of these facts has led to the development and use of many enhanced oil recovery techniques one of which is surfactant-flooding.

Surfactant-flooding involves the injection of an aqueous composition, commonly called a surfactant system, into a subterranean oil bearing formation via one or more injection wells. Typically, the surfactant system comprises salt water and a surfactant, the latter preferably in conjunction with a cosurfactant. Common surfactants proposed for use in oil recovery processes include petroleum sulfonates, alkylsulfates, alkylarylsulfates, alkylaryl sulfonates, alkylsulfonates, alkylpolyethoxyalkylene sulfonates, and quaternary ammonium salts.

Once the surfactant system is injected, the generation of a microemulsion takes place in-situ as the injected surfactant system contacts the oil in place. Following injection of the surfactant system, a mobility buffer is usually injected to improve the sweep efficiency of the surfactant system thereby aiding the latter to move oil toward one or more production wells.

Surfactant-flooding has been an area of active interest in the art of enhanced oil recovery for many years. Considerable research has been conducted to find new and effective surfactants which are useful in surfactant systems employed in oil recovery processes. Therefore, the continued development of such surfactants is highly desirable. Therefore, it is an object of this invention to provide novel surfactants which are useful in surfactant systems.

A further object of this invention is to provide novel surfactant systems which are useful in oil recovery processes.

A further object of this invention is to provide an improved process for recovery of oil employing the above surfactant systems.

These and other objects, advantages, details, features, and embodiments of this invention will become apparent to those skilled in the art from the following detailed description of the invention and the appended claims.

In accordance with the present invention I have discovered that the adduct reaction product resulting from the reaction of maleic anhydride with either a petroleum sulfonate or an alkaryl sulfonate can be utilized as a surfactant for enhanced oil recovery.

Therefore, in one emdodiment of the present invention there are provided novel surfactants useful for enhanced oil recovery.

In another embodiment of this invention there are provided novel surfactant systems containing salt water and the above surfactants which are useful in enhanced oil recovery.

In still another embodiment, wherein a process for the enhanced recovery of oil from an oil bearing subterranean formation which comprises injecting a surfactant system into the formation via one or more injection wells, an improvement is provided which comprises utilizing the above system.

The petroleum sulfonates of this invention preferably contain an alkali metal cation such as sodium. The sulfonate molecule can contain more than one sulfur-containing grouping. Examples of presently preferred petroleum sulfonates are sodium petroleum sulfonates having average equivalent weight within the range of from about 275 to 600 and more preferably from about 325 to 500.

The alkaryl sulfonates useful in this invention are represented by the formula:

wherein R is a $C_8$ to $C_{20}$ alkyl radical and M is ammonium or an alkali metal. Examples of such sulfonates are sodium p-dodecylbenzene sulfonate, sodium p-tetradecylbenzene sulfonate, sodium p-eicosylbenzene sulfonate, sodium p-octylbenzene sulfonate, sodium p-hexadecylbenzene sulfonate, and mixtures thereof. Presently preferred is sodium p-dodecylbenzene sulfonate.

The process of forming the novel surfactant involves reacting meleic anhydride with either the petroleum sulfonate or alkaryl sulfonate at a temperature in the range of about 50° C. to about 250° C. for a period of time from about 2 hours to about 120 hours to form an adduct as a reaction product.

Generally, the molar ratio of maleic anhydride employed relative to the petroleum sulfonate or alkaryl sulfonate is within the range of from 0.1:1 to 2:1, preferably 0.8–1.2.

In a preferred embodiment, the reaction is carried out in the presence of any diluent which is chemically inert, i.e. does not react chemically with the maleic anhydride, petroleum sulfonate, alkyl aryl sulfonate, or reaction product. Presently preferred diluents are unsubstituted, alkyl-substituted, and chlorinated aromatics. Examples of such diluents include benzene, toluene, the xylenes, chlorobenzene, and mixtures thereof. Said diluents are normally employed in diluent to reaction mixture ratios within the range of from 1:1 to 1:5.

In another preferred embodiment, the adduct reaction is cooled and then neutralized with any basic neutralizing agent known in the art to a pH of from about 7 to 13. Examples of such neutralizing agents include sodium hydroxide, ammonium hydroxide, potassium hydroxide, calcium hydroxide, or aqueous solutions of amines. Sodium hydroxide and ammonium hydroxide are presently preferred. Said neutralizing agents are normally employed in an amount relative to the petroleum or alkaryl sulfonate within the range of from 0:1 to 4:1, preferably 0.8:1 to 2.4:1.

The surfactant of the present invention contains the above surfactants and salt water. Broad and preferred ranges of the ingredients of the aqueous composition of this invention are shown in the following table:

TABLE I

| Ingredient | Broad Range | Preferred Range |
|---|---|---|
| Water (parts by wt.) | 100 | 100 |
| Surfactant (parts by wt.) | 0.1–15 | 1–12 |
| NaCl (parts by wt.) | 0.1–10 | 0.1–8 |

In a preferred embodiment a cosurfactant will also be present as they aid in solubilizing the surfactant in the salt water. Examples of useful cosurfactants in this invention include alcohols, nitriles, nitro-compounds, amides, sulfones, sulfoxides, esters, aldehydes, and ketones containing from 1 to 20 carbon atoms and preferrably 1 to 8 carbon atoms.

The presently preferred cosurfactant in the present invention is a $C_1$ to $C_8$ alcohol. Examples of such alcohols include methyl alcohol, ethyl alcohol, isopropyl alcohol, t-butyl alcohol, isoamyl alcohol, octyl alcohols, hexyl alcohols, and mixtures thereof. Most presently preferred are isobutyl alcohol and isoamyl alcohol. Generally, the alcohol should have a solubility of at least 0.1 to 20 and preferably at least 0.1–5 grams per 100 grams of brine.

Whatever cosurfactant is employed in the surfactant and system will generally be present in an amount of from 0.05–15 and preferably 1–7 parts by weight based upon 100 parts by weight of water.

The surfactant systems of this invention may be used as surfactant systems in enhanced oil recovery processes to recover oil from oil-bearing subterranean formations. Such processes typically comprise injecting a surfactant system, sometimes referred to as a surfactant slug, into the oil bearing formations via one or more injection wells. The surfactant system is injected in a amount usually in the range of about 0.001 to 1.0, preferably 0.01 to 0.25 pore volume based on the pore volume of the total treated and produced formation. A microemulsion is formed in-situ as the injected surfactant system contacts the oil in place.

Following injection of the surfactant system, a mobility buffer such as a polyacrylamide, biopolysaccharide, or cellulose ether may be injected into the formation. The injected mobility buffer will then aid in improving the sweep efficiency of the surfactant system thereby increasing the total amount of oil recovered from the subterranean formation.

The following examples illustrate the present invention.

EXAMPLE 1

This example describes the reaction of maleic anhydride with Witco Chemicals TRS 10-410 petroleum sulfonate.

A charge of 50 g (31 g active petroleum sulfonate) Witco TRS 10-410 petroleum sulfonate and 250 mL toluene was placed in a 500 mL round-bottomed flask equipped with magnetic stirring bar, Dean-Stark water separation trap and a water-cooled reflux condenser. (Witco TRS 10-410 is a petroleum sulfonate, having an average equivalent weight of 418, marketed by Witco Chemical Company.) The stirred mixture was boiled for two hours and 2.1 mL water was collected in the Dean-Stark trap. The reaction mixture was cooled to room temperature and 7.2 g (0.074 mol) of maleic anhydride was added. The mixture was refluxed for 48 hours before being stripped of volatiles such as unreacted maleic anhydride, on a rotary evaporator to leave a 53.4 g residue of dark brown solid. An elemental analysis of this solid residue gave the following results: 71.26% C; 10.34% H; <0.1% N; 6.63% S; 10.43% 0.

A neutralization equivalent of 1.3 meq NaOH/g reaction mixture was found for the reaction product.

EXAMPLE II

This Example describes the reaction of maleic anhydride with sodium dodecylbenzenesulfonante.

A charge of 17.4 g (0.05 mol) sodium dodecylbenzenesulfonate, 4.9 g (0.05 mol) maleic anhydride and 100 mL of chlorobenzene was placed in a 250 mL round-bottomed flask equipped with a water-cooled reflux condenser. The reaction mixture was boiled for a period of 74 hours. In order to remove most of the solvent an unreacted maleic anhydride, the reaction mass was concentrated on a rotary evaporator at water aspirator pressure and 100° C. for a period of 4 hours. The remaining unreacted maleic anhydride was volatilized at vacuum pump pressure leaving a reaction mass of about 18.7 g. An elemental analysis of this residue gave the following results: 59.2% C; 7.58% H; 0.05% N; and 8.39% S.

A neutralization equivalent of 1.3 meq/g were found for the reaction product.

EXAMPLE III

The following experimental procedure was used to condition sandstone cores for surfactant flood runs as conducted in Examples IV–VI to demonstrate the effectiveness of the inventive material in tertiary oil recovery.

Berea sandstone cores measuring approximately 3 feet in length and 3 inches in diameter were dried under vacuum for 24 hours at 250° F. Polycarbonate disc end plates with centrally located ⅛" threaded openings were secured to each end of the core with epoxy adhesive before applying an epoxy coating to the outside surface of the core. The epoxy coating material was formulated by mixing 550 g of a commercially available epoxy resin, 50 g of a suitable activator and 140 g diatomaceous earth. The mixture was stirred until smooth before applying to the surface of the core. The cores were rotated continuously as the epoxy mixture was applied with a 2" paint brush. Four gauze strips measuring 2"×12" were applied to the core in the following manner: a first gauze strip was applied to the core and covered with epoxy as the core was rotated; the remaining three strips were then individually incorporated in a similar manner. The core coating was cured over a period of about 4 hours at ambient temperature as the core was rotated. One-eighth inch male connector fittings were placed on each end of the core and pipe plug caps were put on the core.

The core was weighed to determine the dry weight before being saturated with brine of the desired concentration. A vacuum of about 1 mm was pulled on the core before saturating the core with approximately 1000 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected, and the pressure in psi were recorded. With these values the original permeability to water, e.g., on the order of 3.2 mL/min at 43 psi could be recorded. The pore volume of the core was calculated by the relationship:

$$\frac{\text{Brine Saturated Core Wt. (g)} - \text{Dry Core Wt. (g)}}{\text{Brine Density (g/mL)}} = \text{Core Pore Volume (mL)}$$

The brine-saturated core was oilflooded in the conventional manner until oil break-through became detectable by the presence of alternate globules of oil and water in the effluent line. The oilflood was carried out to completion by the 24 hour recycling of oil through the core to remove all of the displaceable water. The total water displaced, i.e., water displaced at the point of oil break-through and water displaced by the 24 hour recycle procedure was recorded as water displaced by oilflood. If desired, oil permeability was determined in a manner analogous to that used above for establishing original permeability to water. Prior to waterflood, the effluent line was air blown to remove oil.

The oilflooded core was waterflooded in the conventional manner until water break-through became detectable by the presence of alternate globules of oil and water in the effluent line. The waterflood was carried to completion by the 24 hour recycling of water through the core to remove all of the displaceable oil. The total oil displaced, i.e., oil displaced at the point of water break-through and oil displaced by the 24 hour recycling procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactantflood tests.

EXAMPLE IV

This Example demonstrates the oil recovery efficiency of the neutralized reaction mass (pH of surfactant system was 9.4) resulting from the thermal reaction of petroleum sulfonate (Witco TRS 10-410) and maleic anhydride.

The surfactant flooding was carried out in the conventional manner of sequentially injecting the surfactant system and a thickened aqueous mobility buffer of polyacrylamide diluted with Arkansas-Burbank water continuously during the course of its injection. (Arkansas-Burbank water is essentially fresh water with less than 350 ppm total dissolved solids.)

The surfactant system had the following composition:

| | |
|---|---|
| 8.71 g | TRS 10-410/Maleic Anhydride Adduct |
| 4.50 g | Isobutyl Alcohol (IBA) |
| 1.50 g | Sodium Chloride (NaCl) |
| 135.29 g | Arkansas-Burbank Water (A-B H$_2$O) |
| 150.0 g | Total Composition |

Thus, each component was present in the following weight percentages:

| | |
|---|---|
| (Neutralized) TRS 10-410/Maleic Anhydride Adduct | 3.6 |
| IBA | 3.0 |
| NaCl | 1.0 |
| A-B H$_2$O | 92.4 |

The pore volume (PV) of the 3″×3′ cylindrical Berea sandstone core was 829 mL. A 62.17 mL slug (7.5% PV) of the above surfactant system was injected and it was followed by 414.5 mL (0.5 PV) of Betz Hi Vis polyacrylamide (1700 ppm) in Arkanss-Burbank water. Betz Hi Vis is a commercially available polyacrylamide from Betz Laboratories, Trevose, Pennsylvania, having an average molecular weight of from 8,000,000–12,000,000 and an average degree of hydrolysis of from 27–34%.

In preparing the core, 589.2 mL of brine, 1 weight percent NaCl in A-B water, was displaced from the water-saturated core by oilflood indicating the introduction of approximately 589.2 mL of oil into the core. Subsequent waterflood resulted in approximately 292.7 mL of oil being displaced from the core leaving approximately 296.5 mL of waterflood residual oil in the Berea sandstone core prior to the surfactantflood.

In the course of the surfactantflood, a total effluent of 2.23 pore volumes (ca. 1851 mL) was collected which contained 272.3 mL of tertiary oil representing 91.8% of the waterflood residual oil.

EXAMPLE V

This example demonstrates the oil recovery efficiency of the reaction mass (pH of surfactant system was 2) resulting from the thermal reaction of petroleum sulfonate (Witco TRS 10-410) and maleic anhydride.

The surfactantflooding was carried out in the conventional manner of sequentially injecting the surfactant system and a thickened aqueous mobility buffer of polyarcrylamide diluted with Arkansas-Burbank water continuously during the course of its injection.

The surfactant system had the following composition:

| | |
|---|---|
| TRS 10-410/Maleic Anhydride Adduct | 3.6 |
| IBA | 3.0 |
| NaCl | 1.3 |
| A-B H$_2$O | 92.1 |

The pore volume of the 3″×3′ cylindrical Berea sandstone core was 830 mL. A 62.25 mL slug (7.5% PV) of the above surfactant system was injected and it was followed by 415 mL (0.5 PV) of Betz Hi Vis polyarcrylamide (1700 ppm) in Arkansas-Burbank water.

In preparing the core, 588.9 mL of brine, i.e., 1.3 weight percent NaCl in A-B water, was displaced from the water-saturated core by oilflood indicating the introduction of approximately 588.9 mL into the core. Subsequent waterflood resulted in approximately 295.5 mL of oil being displaced from the core leaving approximately 293.4 mL of waterflood residual oil in the Berea sandstone core prior to the surfactantflood.

In the course of the surfactantflood, a total effluent of 2.2 pore volumes (ca. 1834 mL) was collected which contained 222 mL of tertiary oil representing 75.6% of the waterflood residual oil.

EXAMPLE VI

This Example demonstrates the oil recovery efficiency of the sodium hydroxide neutralized reaction mass (pH of surfactant slug was 9.4) resulting from the thermal reaction of maleic anhydride and p-dodecylbenzene sulfonate.

The sufactantflooding was carried out in the conventional manner of sequentially injecting a preflush system, the surfactant system, and a thickened aqueous mobility buffer system of polyacrylamide diluted with Arkansas-Burbank water continuously during the course of its injection.

The preflush system had the following composition:

| | |
|---|---|
| 0.2 g | Sodium Bicarbonate |
| 0.1 g | Sodium Carbonate |
| 3.0 g | Isoamyl Alcohol |
| 3.0 g | NaCl |
| 93.7 g | Arkansas-Burbank Water |
| 100 g | Total Composition |

The surfactant system had the following composition:

| | |
|---|---|
| 3.16 g | p-DBS/MA Adduct |
| 0.57 g | Sodium Hydroxide |
| 3.0 g | Isoamyl Alcohol |
| 0.3 g | Sodium Bicarbonate |
| 3.0 g | NaCl |
| 89.97 g | Arkansas-Burbank Water |
| 100 g | Total Composition |

The pore volume of the 3"×12" cylindrical Berea sandstone core was 279 mL. A 69.7 mL (0.25 PV) slug of preflush was injected followed sequentially by 55.8 mL (0.2 PV) of the above surfactant system and 139.5 mL (0.5 PV) of Betz Hi Vis polyacrylamide (1700 ppm) diluted with Arkansas-Burbank water.

In preparing the core, 207 mL of brine, i.e., 3 weight percent NaCl in Arkansas-Burbank water, was displaced from the water-saturated core by oilflood indicating the introduction of approximately 207 mL of oil into the core. Subsequent waterflood resulted in about 114.5 mL of oil being displaced from the core leaving approximately 92.5 mL of waterflood residual oil in the Berea sandstone core prior to the surfactantflood.

In the course of the surfactantflood, a total effluent of 3.6 pore volumes (ca. 1000 mL) was collected which contained 60.5 mL of tertiary oil representing 65.4% of the waterflood residual oil.

Reasonable variations and modifications which will become apparent to those skilled in the art can be made in this invention without departing from the spirit and scope thereof.

I claim:

1. A surfactant system useful for tertiary oil recovery consisting essentially of:
   (a) 100 parts by weight of water;
   (b) 0.1-10 parts by weight of sodium chloride;
   (c) 0.1-15 parts by weight of a surfactant composition made by the process comprising reacting maleic anhydride with either a petroleum sulfonate having an equivalent weight of from 275 to 600 or an alkaryl sulfonate of the formula

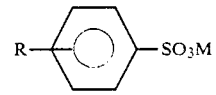

wherein R is a $C_8$ to $C_{20}$ alkyl radical and M is ammonium or an alkali metal at a temperature of from about 50° C. to 250° C. for about 2 hours to 120 hours.

2. A surfactant system according to claim 1 wherein (a) said sodium chloride is present in an amount of from 0.1-8.0 parts by weight and (b) said surfactant composition is present in an amount of from 1 to 12 parts by weight.

3. A surfactant system according to claim 1 further containing 0.05-15 parts by weight of a $C_1$ to $C_8$ alcohol cosurfactant.

4. A surfactant system according to claim 3 wherein said alcohol is isobutyl alcohol or isoamyl alcohol.

5. In a process for the recovery of oil from a subterranean formation which comprises injecting a surfactant system into the formation via one or more injection wells, the improvement which comprises utilizing a surfactant system consisting essentially of:
   (a) 100 parts by weight of water;
   (b) 0.1-10 parts by weight of sodium chloride;
   (c) 0.1-15 parts by weight of a surfactant composition made by the process comprising reacting maleic anhydride with either a petroleum sulfonate having an equivalent weight of from 275 to 600 or an alkaryl sulfonate of the formula:

wherein R is a $C_8$ to $C_{20}$ alkyl radical and M is ammonium or an alkali metal at a temperature of from about 50° C. to 250° C. for about 2 hours to 100 hours.

6. A process according to claim 5 wherein the aqueous composition comprises: (a) said sodium chloride is present in an amount of from 0.1-8.0 parts by weight and (b) said surfactant composition is present in an amount of from 1 to 12 parts by weight.

7. A process according to claim 5 wherein the aqueous composition further comprises 0.05-15 parts by weight of a $C_1$ to $C_8$ alcohol cosurfactant.

8. A process according to claim 7 wherein said alcohol is present in an amount of from 1-12 parts by weight.

9. A process according to claim 7 wherein said alcohol is isobutyl alcohol.

10. A process according to claim 7 wherein said alcohol is isoamyl alcohol.

* * * * *